United States Patent [19]

Rosa

[11] 4,204,479
[45] May 27, 1980

[54] COIL CONTAINMENT COVER

[76] Inventor: Gilbert L. Rosa, 399 Prospect Cir., Lower Burrell, Pa. 15068

[21] Appl. No.: 891,555

[22] Filed: Mar. 30, 1978

[51] Int. Cl.² .......................... B60P 7/02; B60P 7/12; B61D 45/00

[52] U.S. Cl. ...................................... 206/397; 410/47; 206/54

[58] Field of Search ............................. 105/367, 473; 280/179 A

[56] References Cited

U.S. PATENT DOCUMENTS

| | | | |
|---|---|---|---|
| 1,850,597 | 3/1932 | McGuire | 105/367 |
| 2,817,304 | 12/1957 | Newcomer et al. | 105/367 |
| 2,873,692 | 2/1959 | Schey et al. | 105/367 X |
| 2,977,900 | 4/1961 | Farrar | 105/367 X |
| 3,009,426 | 11/1961 | Nampa | 105/367 |
| 3,111,234 | 11/1963 | Bower et al. | 105/367 X |
| 3,302,590 | 2/1967 | Kneller et al. | 105/367 |

*Primary Examiner*—Howard Beltran

*Attorney, Agent, or Firm*—Parmelee, Miller, Welsh & Kratz

[57] ABSTRACT

A removable cover and containment means for a single truck bed mounted coil of sheet steel or the like. The cover is rigid, generally semicylindrical in shape and is adapted to fit over a standard sized coil of steel. The cover is further adapted so that after it has been placed over the steel coil a removable core member can be run through one side of the cover and the center of the steel coil and then firmly secured to another side of the cover so that any unwinding slippage of the coil will be effectively contained. In a preferred embodiment of this invention, the core member is secured to one side of the cover by means of screw threads and a portion of that core member pushes a friction brake element against the steel coil so that any angular unwinding or slippage of the coil will tighten the core member into the screw retainer and thereby increase the braking force applied to the coil and automatically restrain incipient unwinding.

6 Claims, 8 Drawing Figures

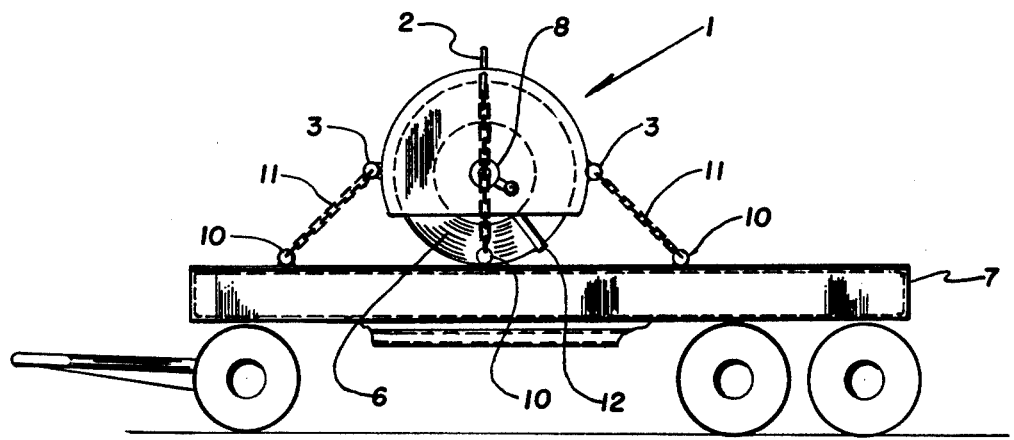
Fig. 1
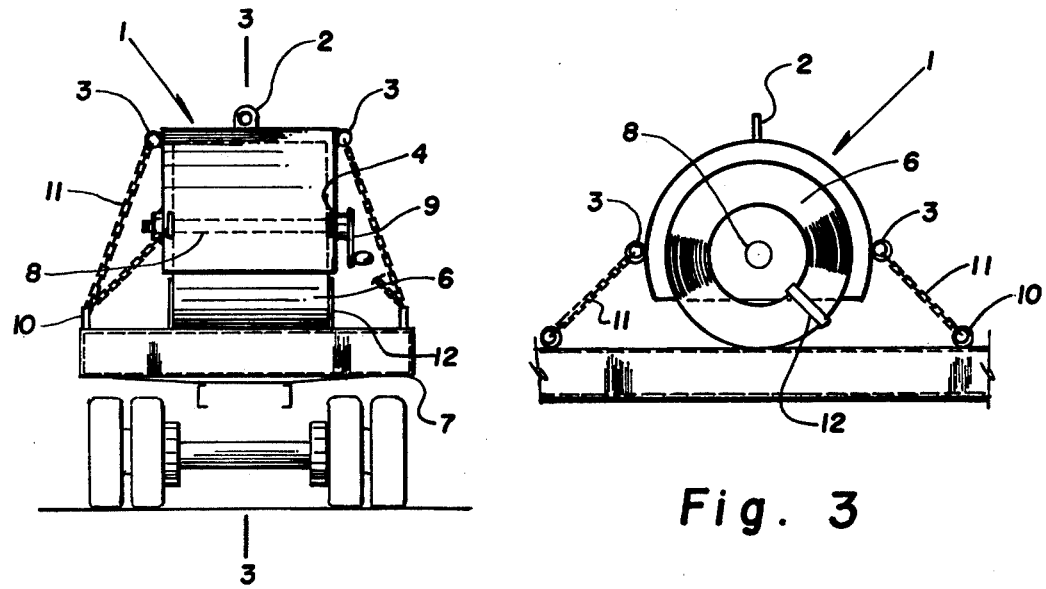
Fig. 2
Fig. 3
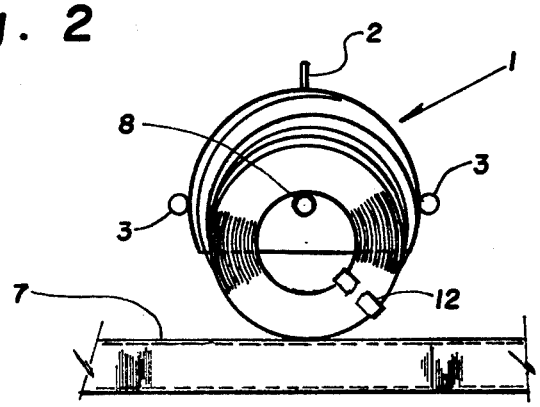
Fig. 4

COIL CONTAINMENT COVER

This invention relates to a cover and restraining means for coils of sheet steel which allow such coils to be transported by truck or like vehicle without the need of elaborate and expensive superstructures which must be especially adapted to the carrying of such cargo.

Among the most widely used forms of steel are hot and cold flat rolled sheets. Sheet steel comprises an essential element of many manufactured products, and a number of important industries are heavily dependent upon a continuing and reliable source of this material in order to maintain the efficiency of their operations.

Notwithstanding the great importance of flat rolled sheet steel, its transportation has presented a continuous problem. Such a product, which may have a thickness to width ratio of 0.05 inch to 56 inches and which may be produced in sheets of up to a half mile in length, is obviously not easily moved from the rolling mill to the site of fabrication. A common, and probably the most efficient, means of effecting such transportation is to wind the sheet steel into large and tightly wound coils, to band the coils, and then to mount the coils on the bed of a truck or a railroad flat car. These coils generally weigh from one to ten tons and, because of their huge size and physical characteristics of the tightly wound sheet metal, tremendous force is unleashed if the retaining band fails and the coil springs apart. The result of such an unwinding while the coil is being transported by truck on a crowded highway could be hazardous to people and equipment.

Accordingly, it is the object of this invention to provide a simple and efficient means for safeguarding against the possibility that a truck bed mounted coil of sheet metal might spring apart while it is in transport.

Another object of the present invention is to provide a means for a facilitating the loading and unloading of sheet steel coils onto and from the beds of transporting vehicles.

A still further object of this invention is to provide an inexpensive weather cover for truck bed mounted coils of sheet steel.

The invention is illustrated in the accompanying drawings, in which:

FIG. 1 is a side view of a trailer on which is mounted a coil of sheet steel which is covered and restrained by the present invention;

FIG. 2 is a rear view of such a trailer;

FIG. 3 is a view taken generally along the line 3—3 of FIG. 2 which shows the position of the cover relative to the enclosed sheet steel coil while the coil is fully wound and banded.

FIG. 4 is the same view as FIG. 3, except it shows the operation of the cover and the position in which it restrains the steel coil if the band fails and the coil springs open;

Figure 5:
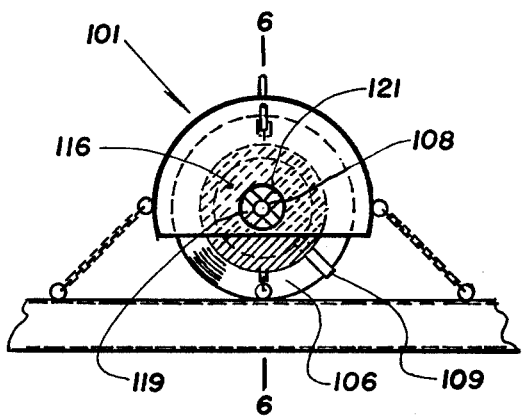
FIG. 5 is a side view of a trailer on which a covered coil of sheet steel is mounted and on which another embodiment of the present invention is disclosed.

Referring to FIGS. 1 and 2, the sheet steel coil covers 1 of this invention include a crane lifting point 2; a plurality of chain eyes 3, used as tie-down points; an aperture 4 on one of its end members; and a screw retaining means 5 on its other end member. The cover is adapted in size to fit over one of several standard sizes of sheet steel coil when such a coil rests on its nonplanar surface. After the coil 6 has been mounted on the bed of the trailer 7, the cover is placed over it in the manner shown in the figures. A removable shaft 8 which is provided with screw threads on one end and a head at the other end is placed first through the aperture 4, then through the center of the coil 6, and finally into the screw retainer 5. The shaft 8 is tightened into a screw retainer means 5 by means of a wrench as a permanent or removable crank 9. The cover chain eyes 3 are connected to the tie-down points 10 and the trailer by means of a plurality of chains 11 or like attachment means.

The means by which the present invention will safeguard against the unwinding of the coil 6 is disclosed by FIGS. 3 and 4. Under normal conditions, the restraining band 12 prevents the coil from unwinding. In the absence of the cover 1, the coil 6 would, of course, spring apart if the restraining band 12 should fail. When, however, the cover 1 is placed over the coil 6 and the shaft 8 is tightened into place, such motion by the coil 6 will be effectively controlled. As shown in FIG. 4, the portion of the coil 6 which defines its outer surface will move outward from its original position, that is, away from the center of the coil. The outer surface of the coil 6 will soon come into contact with the interior surface of the cover 1. At this point in time, the movement of the outer surface of the coil 6 may be terminated by virtue of the effect of chains 11. If these tie-down means are not effective, the outer surface of the coil will move the cover 1 upward and away from the trailer until the shaft 8 comes into contact with the inner surface of the coil 6. At this point in time, the contact between the inner surface of the coil 6 and the shaft 8 will restrict further upward movement to the cover under the pressure from the outer convolution of the coil.

FIGS. 5, 6, 7, and 8 disclose another embodiment of the present invention. In this embodiment a large perforated disc 116 is inserted between the cover 101 and the coil 106 in such a way as to exert pressure on a plane side of the coil 106 and to thereby further resist any motion by the coil 106 relative to the cover 101. As will be disclosed herein, the disc 116 can be further adapted to increase the pressure exerted on the coil 106 in response to any incipient angularly directed force which the coil 106 might exert on the disc 116.

Figure 7:
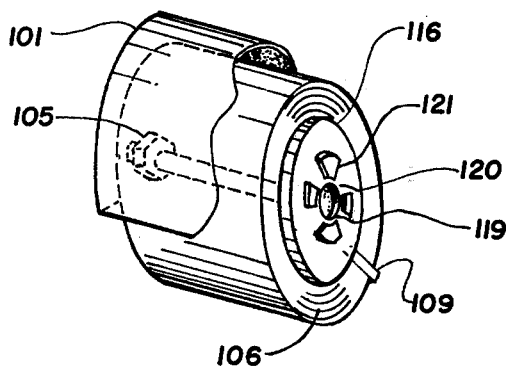
FIG. 7 is a fragmentary detail, in perspective, of the retaining shaft and the friction brake members of the embodiment disclosed in FIG. 5.

The disc 116 is preferably inlaid, on its face which abuts to the coil, with wood or some other material which would not damage the sheet steel and which would maximize the friction resulting from any movement or slippage of the sheet metal against it. As is shown in FIG. 7, the disc 116 is further adapted with a plurality of teeth 121 on its face which does not abut the coil.

Figure 8:
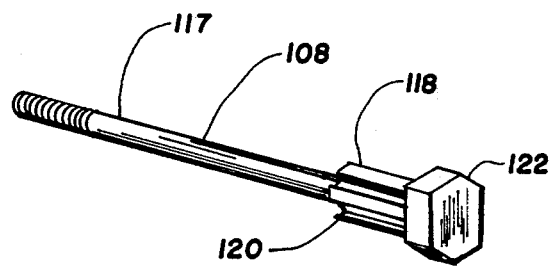
FIG. 8 is a detail in perspective of the retaining shaft of the embodiment disclosed in FIG. 5.

FIG. 8 discloses that in this embodiment of the present invention the shaft 108 is of a somewhat different construction than the one disclosed in FIGS. 1 through 4. That is, it is of two different diameters. The thinner section 117 of the shaft 108 is opposite from the headed end and is of a smaller diameter than the thicker section 118 which is adjacent to the head 122. Both the thinner section 117 and the thicker section 118 are of a small enough diameter to enable them to pass through the aperture 104 in the cover 101, but only the thinner section 117 is of a small enough diameter to enable it to pass through the perforation 119 in the disc 116. The thicker portion 118 is also adapted with a plurality of teeth 120 which are constructed in such a way as to be engageable with teeth 121 which constitute a part of the disc 110.

Figure 6:
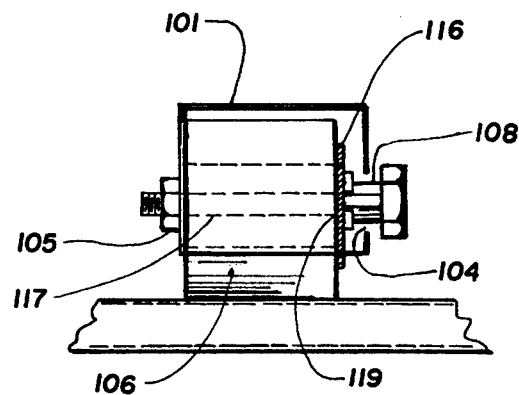
FIG. 6 is a view taken along line 5—5 of FIG. 5.

Referring to FIG. 6, when the thinner section 117 of the shaft 108 is inserted through the aperture in the cover and the perforation 119 in the disc and is secured into the screw retainer means 105, the disc 116 is pushed up against the coil 106 by the thickener section 118 of the shaft 108.

In this embodiment of the present invention, a shaft 108 with a right-handed screw thread is employed with coils that have been wound in a counterclockwise direction and a left-handed screw thread is employed with coils that have been would in a clockwise direction.

Referring to FIG. 7 and assuming that the coil 106 has been wound in a counterclockwise direction, it can be seen that, if the band 109 allows the coil to begin to slip, it will unwind in a clockwise direction and it will, if the disc 116 has been adequately tightened against it, impart such movement to the disc 116. By virtue of the teeth 121 on the surface of the disc which are engaged with the teeth 120 in the shaft 108, the shaft will be turned to the right and will, therefore, be tightened into the screw retaining means 105. Such tightening will increase the pressure exerted on the coil 106 by the disc 116 and will therefore increase frictional resistance to further movement of the coil. In this way, incipient slippage of the coil will be automatically stopped. Such a system, if properly constructed, will result in the establishment of the mechanical equilibrium which will enable even the largest coils of sheet steel to be transported in safety.

It will be apparent to those skilled in the art that this equilibrium can also be established through a number of similar embodiments of the present invention. For example, one of the end panels of the cover can merely be disassociated from the cover and be tightened against the coil. It is to be further understood that the cover and restraining means shown in the drawings is readily adapted for use on railroad flat cars.

I claim:

1. A removable cover containment means adapted to be supported by a coil of sheet steel, the coil having a central opening therethrough, said cover and containment means comprising:
   (a) a rigid cover member adapted in size and shape to fit over and to substantially enclose said coil when said coil is positioned on its peripheral surface;
   (b) means extending lengthwise through the center of the coil and rigidly connecting opposed end members of the coil mounted cover by which the cover is restrained against removal in a radial direction from the supporting coil.

2. The cover containment means of claim 1 wherein at least one of said end members of the cover is separate from the cover.

3. The cover containment means of claim 2 where an end member which is separate from the cover is arranged to increase frictional engagement of the end member with the contiguous ends of the coil by movement of any convolutions of the coil relevant to the central axis of the coil.

4. The cover containment means of claim 1 where a braking element is arranged in such a way as to create frictional resistance to movement by any convolutions of the coil relevant to the central axis of the coil.

5. The cover containment means of claim 4 where said braking element and said restraining means extending through the center of the coil are arranged to increase frictional resistance to further movement, relative to the central axis of the coil, as a response to incipient motion by any convolutions.

6. The removable cover containment means of claim 1 where the coil is further supported by a bed portion of a transporting vehicle and tiedown means are provided between the cover member and said bed portion.

* * * * *